Oct. 10, 1972 J. J. CUOMO 3,697,342

METHOD OF SELECTIVE CHEMICAL VAPOR DEPOSITION

Filed Dec. 16, 1970 2 Sheets-Sheet 1

INVENTOR
JEROME J. CUOMO

BY Isidore Match

ATTORNEY

United States Patent Office 3,697,342

Patented Oct. 10, 1972

3,697,342

METHOD OF SELECTIVE CHEMICAL VAPOR DEPOSITION

Jerome J. Cuomo, Bronx, N.Y., assignor to International Business Machines Corporation, Armonk, N.Y.

Filed Dec. 16, 1970, Ser. No. 98,533
Int. Cl. B44d *1/02*; C03c *15/00*
U.S. Cl. 156—13 8 Claims

ABSTRACT OF THE DISCLOSURE

Metals are caused to be deposited selectively in the hydrogen reduction of their compounds which are either gaseous bearing or of adequate vapor pressure. The process is termed selective-chemical vapor deposition since the metal is deposited only on prepatterned areas of a substrate. The substrate is suitably a glass such as a borosilicate, boroalumino-silicate, phosphoalumino-silicate, phosphosilicate or soda-lime glass. The selective-chemical vapor deposition process occurs when two surfaces with different chemical reactivities are exposed to the chemical vapor deposition environment. The prepatterned areas provide one of these surfaces, such areas comprising a nucleation layer of a material such as chromium, tungsten, molybdenum, copper, aluminum, silicon, silicon dioxide, aluminum oxide, silicon nitride and the like, or a composite layer of chromium-copper, chromium-copper-chromium and the like. The other surface is provided by the remainder of the surface of the exposed substrate. The surface provided by the prepatterned area acts as a metal nucleation site while the glass surface is chemically eroded (ablated) and the metal does not nucleate thereon. An example of the process is the chemical reduction of copper hexafluoroacetylacetonate by hydrogen in the presence of hydrogen fluoride or sulfur hexafluoride in a reaction chamber. The chamber contains a substrate having a patterned nucleating layer thereon on which the reduced copper deposits while the substrate is ablated by the fluoride. The deposition reactions and simultaneous ablation reaction, acting in close proximity, are essential elements of the inventive process.

BACKGROUND OF THE INVENTION

This invention relates to a method of selective chemical vapor deposition. More particularly, it relates to a method for selectively chemically depositing metals on a substrate.

In many situations, it may be desired to deposit a metal on a structure as an overcoating thereon or as a growth in a given pattern. For example, such deposition can be employed in the deposition of a refractory metal on a patterned insulator or the encapsulation of metal conduction lines with the deposited metal, and the like.

In the application of Jerome J. Cuomo and Robert A. Laff, entitled "Method of Selective Chemical Deposition," Ser. No. 98,534, filed Dec. 16, 1970 and assigned to the International Business Machines Corporation, there is disclosed a method for selectively chemically depositing a refractory metal such as tungsten, molybdenum, and the like on a patterned substrate. In this method, a given pattern of a material which provides a nucleating surface for the refractory metal which it is desired to deposit is provided on a substrate by photolithographic or other suitable techniques. A gaseous bearing or adequate vapor pressure compound form of the metal which it is desired to deposit is caused to be reduced whereby it deposits on the nucleating surface. The substrate is chosen such that it reacts chemically with the metal compound and the reaction product of the reduction reaction whereby its exposed surface is ablated away concurrently with the deposition of the metal on the nucleating surface. In an example of this method, the substrate may be a borosilicate or soda-lime glass, the nucleating surface material may be one such as tungsten, silicon dioxide, chromium, silicon, aluminum oxide, etc., and the metal to be deposited is a refractory one such as tungsten, molybdenum, and the like. The reducing agent is suitably hydrogen which is reacted with a gaseous bearing or adequate vapor pressure compound of the metal to reduce the compound to the metal, a typical reaction being that of tungsten hexafluoride with hydrogen at about 400° C. to produce tungsten which deposits on the nucleating surface, and hydrogen fluoride. During the reduction reaction, the tungsten deposits while the exposed surface of the substrate is chemically eroded, i.e. ablated away by its reaction with hydrogen fluoride and the gaseous metal compound. The mechanism of the method is believed to be the different chemical reactivities of the exposed substrate and the nucleating surface materials with hydrogen fluoride and the metal compound.

The method disclosed in the aforementioned application, while effective with metals such as tungsten and molybdenum which form gaseous bearing or adequate vapor pressure compounds at practicable reaction temperature (400° C., for example) and wherein the metal products and the reaction products of the reduction reaction have different chemical reactivities toward the nucleating surface and the exposed substrate surface, cannot be used to deposit metals where the gaseous bearing and adequate vapor pressure compounds of these metals and the reaction products of their reductions do not react differently toward the nucleating and exposed substrate surfaces and wherein reduced metal deposition occurs on both surfaces. Clearly, it would be desirable to extend the principles of the invention disclosed in the aforementioned application to enable the selective chemical vapor deposition of those metals which do not meet the requirements set forth therein, for example, metals such as copper, silver, gold, aluminum, chromium, etc. being particularly desirable.

Accordingly, it is an important object of this invention to provide a method for providing a metal in a given pattern on a substrate.

It is another object to provide a method in accordance with the preceding effect for selectively chemically depositing such metal.

It is a further object to convert a chemical vapor deposition reaction to a selective chemical vapor deposition reaction by the introduction into a chemical vapor deposition system, the necessary materials to achieve selectivity.

SUMMARY OF THE INVENTION

Generally speaking and in accordance with the invention, there is provided a method for depositing a metal in a chosen pattern on a substrate body of a chosen material. The method comprises the providing as the metal, one which forms a gaseous bearing or relatively high vapor pressure compound at a desired temperature, the compound being reducible to the metal; the providing of ablating material which assumes a gaseous state at the aforesaid temperature and which is substantially chemically reactive with the substrate material; and the providing on the surface of the substrate body in the aforementioned chosen pattern, a layer of a protective material which is substantially non-chemically reactive with the ablating material. The metal compound is reduced to the metal in a reducing atmosphere in a vessel containing the substrate body having the protective material layer thereon while there is concurrently provided the ablating material in the vessel whereby the surface of the protective material forms a nucleating surface on which the metal deposits, the portion of the substrate body surface not having the protective material layer thereon being concurrently ablated away during the reduction and the metal deposition.

In the inventive method, the substrate material is suitably a glass such as borosilicate or soda-lime glass. The protective material may be one such as chromium, tungsten, silicon, silicon dioxide, silicon nitride, molybdenum, chromium-copper and chromium-copper-chromium. The ablating material may suitably be one such as sulfur hexafluoride, sulfur hexachloride, hydrogen fluoride and hydrogen chloride. The reducing atmosphere can be hydrogen. The gaseous or substantially high vapor pressure metal compound may be the hexafluoroacetylacetonate of the metal. The reaction temperature can suitably be from room temperature up to 700° C.

The foregoing and other objects, features, and advantages of the invention will be apparent from the following more particular description of the preferred embodiments of the invention.

DESCRIPTION OF A PREFERRED EMBODIMENT

In accordance with the invention, the selective chemical vapor deposition process deposits the metal, e.g. copper on discrete prepatterned areas. The prepatterned surfaces act as nucleating sites for copper whereas the unpatterned, i.e. exposed surface of the substrate does not nucleate the copper but, instead, is chemically eroded (ablated). The inventive process depends upon the presence of surfaces with different chemical reactivities such that deposition takes place in one area and not in the other although the surfaces are in excess of the activation energy for the deposition process. It is believed that an explanation of the mechanism of the invention is that the ablative surface presents a different chemical reaction path for the reactants in the presence of ablating agents and the nucleation of the metal does not occur whereas the metal reduction reaction path is followed on the nucleation surface.

Figure 1:
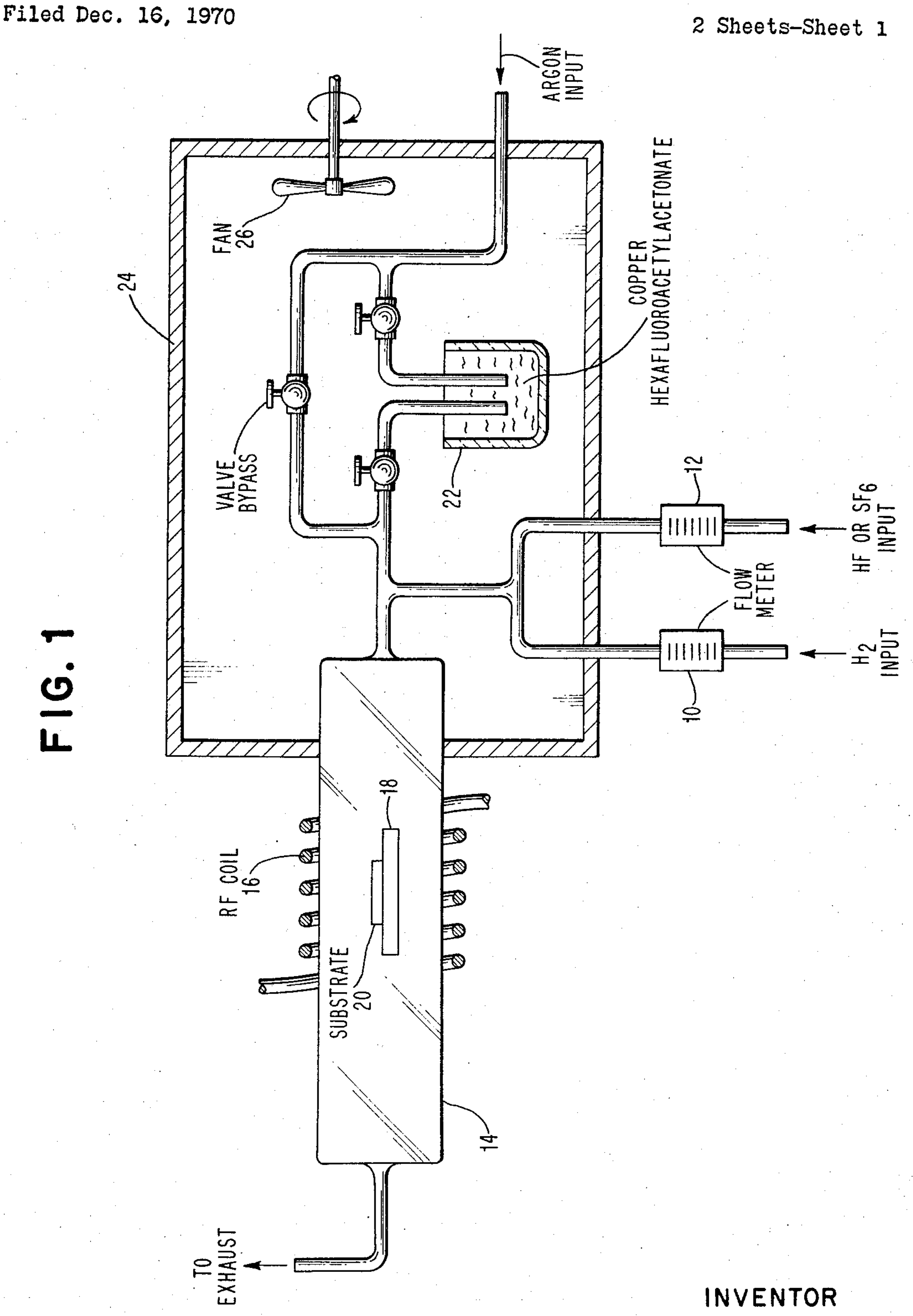
FIG. 1 is a schematic depiction of apparatus for carrying out the process according to the invention.

In FIG. 1, there is shown a suitable apparatus for carrying out the inventive process. The apparatus is constituted essentially of stainless steel with the exception of the reaction chamber which is suitably made of quartz.

In this apparatus, an input source of hydrogen and an input source of hydrogen fluoride or sulfur hexafluoride are passed through flow meters 10 and 12, respectively into a quartz reaction tube 14. Reaction tube 14 is suitably heated by an RF coil 16 which is connected to an RF generator. Within tube 14, there is disposed a carbon susceptor 18 upon which there rests a patterned substrate 20 of a suitable glass material such as borosilicate, soda-lime glass, etc. The pattern material on substrate 20 is a material such as chromium, tungsten, molybdenum, copper, aluminum, silicon, silicon dioxide, aluminum oxide, silicon nitride and the like or a composite layer of chromium-copper, chromium-copper-chromium and the like.

A source of gaseous bearing or adequately high vapor pressure metal compound is contained in a vessel 22, an example of such compound being copper hexafluoroacetylacetonate which is a gaseous bearing form of copper at relatively low temperatures. Vessel 22 is contained in a chamber 24 which is suitably heated to a temperature of 130–150° C. A fan 26 may be provided within chamber 24 to effect uniform heat distribution. A source of argon 28 or other suitable inert gas is provided to function as a carrier gas for the copper compound. The gases exiting reaction tube 14 are exhausted into a high velocity fume hood (not shown).

The substrate prior to patterning may be ultrasonically cleaned in detergent and then in hot sulfuric-dichromic acid solution. It may then be rinsed in deionized water, alcohol, and finally, in Freon vapor. The patterned nucleating coatings on substrate 20 may be deposited or prepared by photolithographic technique electron beam evaporation or sputtering.

In carrying out the invention, the temperature range at which the copper hexafluoroacetylacetonate is maintained is about 130–150° C. The argon or other relatively inert carrier gas flow is from 100 cc. to 1000 cc. per minute. The ratio of the volume of hydrogen fluoride flow to that of hydrogen flow per minute is about 0.01 to 0.1. Typical values are one liter of hydrogen fluoride per minute and ten liters of hydrogen per minute.

In the process according to the invention, the gaseous bearing metal compound, i.e., the copper hexafluoroacetylacetonate, is reduced by hydrogen to copper which deposits and grows on the surface of the patterned layer. The hydrogen fluoride or sulfur hexafluoride react with the exposed areas of the surface of the substrate glass material whereby no nucleation takes place and it is ablated away. Although, there has been illustrated as an example, a gaseous bearing or high vapor pressure copper compound, the process according to the invention is applicable to all gaseous bearing or high vapor pressure metal compounds using a substrate which is chemically reactive with the hydrogen fluoride and the sulfur hexafluoride or other gaseous medium with which the glass reacts such as the chlorides of the latter, for example. The patterning material on the substrate surface is of a material as has been mentioned above which functions as a nucleating material for the reduced metal. It is substantially unreactive with the hydrogen fluoride or sulfur hexafluoride or other reactive gaseous medium.

Two modes of selective chemical vapor deposition can be achieved by the inventive process, viz "overcoating" and "growth" modes.

In the overcoating mode, selective chemical vapor deposition occurs when the nucleating layer has essentially a three-dimensional form. The selective chemical vapor deposition growth mode is distinguished from the overcoating mode in that the nucleating surface has essentially a two-dimensional shape which is developed into a three-dimensional structure. For example, a three-dimensional metal structure such as copper can be selectively grown on these films of nucleating material patterned on a non-nucleating surface. A thin film, of the order of a few hundred angstroms thickness, can be grown into a structure of many microns thickness while maintaining its shape, i.e. with little lateral growth.

In considering the mechanism of the inventive process, the deposition reactions and concurrent ablation reactions acting in close proximity are an essential element thereof. In this connection, the nucleating surfaces can be considered as a protective layer relative to the reactive gaseous medium, i.e. hydrogen fluoride or sulfur hexafluoride for example. The protective materials which are suitable for providing nucleating surfaces are either unaffected by hydrogen fluoride and sulfur hexafluoride, etc., or the rate of attack is sufficiently slow whereby sufficient reduced metal can accumulate on the nucleating surface. The characteristic feature of the glass substrate is that it tends to be more easily attacked by the ablating material.

The general composition of examples of materials which are ablated are shown in the following table under the heading of soft glass and hard glass. Soft glass, also known as soda-lime glass is composed mainly of $SiO_2$ and $Na_2O$. Hard glass of the borosilicate type is generally composed of $SiO_2$ and $B_2O_3$. Both aluminum and barium are often chemically significant species in determining properties of these glasses. The $SiO_2$ in both types of glasses is approximately 50 to 70 percent by weight. A mechanism for the rapid rate of $SiO_2$ removal in the glass materials might be modeled upon the solution corrosion mechanism for glass. The reaction with or the leaching of the more reactive species in the glass would expose an open network of $SiO_2$ of high specific surface. The reaction rate of such an active surface far exceeds that of a coherent planar surface as is present in fused quartz.

TABLE III.—APPROXIMATE CONSTITUENT OXIDES (WEIGHT PERCENT)

| Class | Type | $SiO_2$ | $Na_2O$ | $K_2O$ | CaO | MgO | $B_2O_3$ | $Al_2O_3$ | BaO | $Li_2O$ |
|---|---|---|---|---|---|---|---|---|---|---|
| Soft glass | Soda-lime | 70.1 | 16.8 | 0.3 | 5.4 | 3.6 | 0.8 | 2.58 | | |
| Hard glass | Borosilicate | 65.5 | 4.3 | 3.1 | 1.0 | | 16.0 | 5.5 | 2.5 | |
| | | 70.0 | | 0.5 | 0.1 | 0.2 | 28.0 | 1.1 | | |
| | | 50.2 | | | | | 13.8 | 10.7 | | 25.0 |

Figure 2:
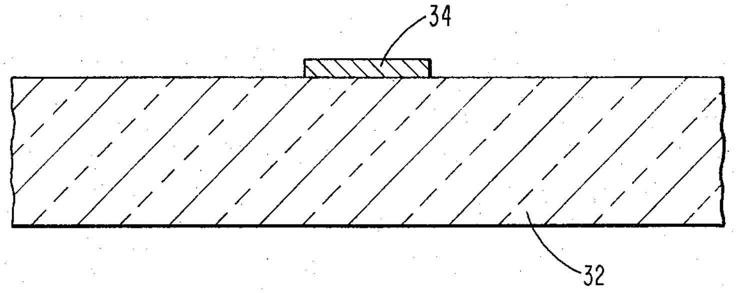
FIG. 2 is a cross-sectional view of a substrate prior to selective chemical vapor deposition thereon.
Figure 3:
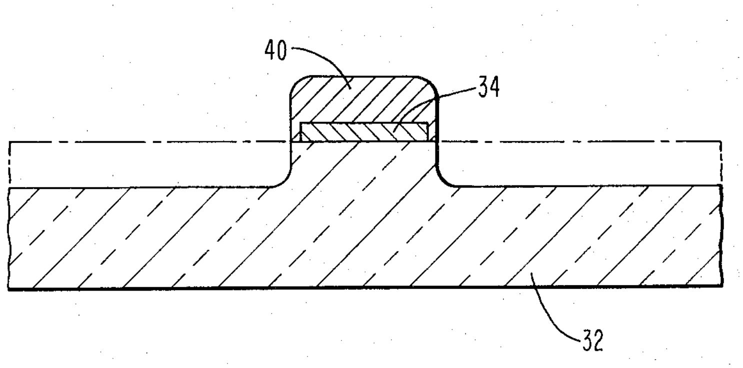
FIG. 3 is a view similar to that of FIG. 2 but after selective chemical vapor deposition thereon.

FIG. 2 shows the substrate 32 having the nucleating surface material thereon. FIG. 3 shows the situation which obtains after selective chemical vapor deposition. It is seen therein that the metal accumulates on the nucleating area and some glass ablates in the non-nucleating area.

Figure 4:
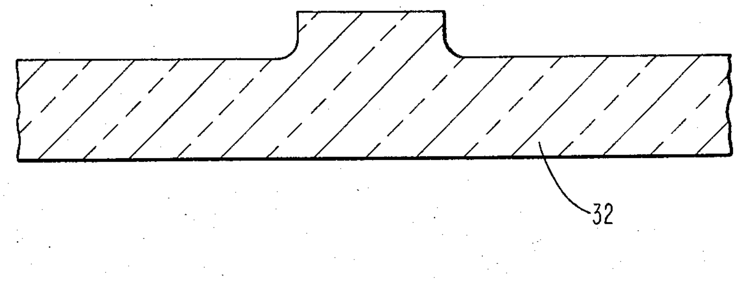
FIG. 4 is a view similar to that of FIGS. 2 and 3 with the nucleating material and grown metal removed therefrom.

When glass is etched by conventional techniques, undercutting usually occurs when etching is carried to relatively large depths. If however, the selective chemical vapor deposition technique is used according to the invention, and then the nucleating and grown metal material is removed from the surface of the substrate, the glass is etched in accordance with the pattern of nucleating layer. This is shown in FIG. 4. An effective removal method is to remove the nucleated copper with nitric acid and then to remove the nucleating surface, tungsten for example, with a KOH, $K_2Fe_3(CN_6)$ solution.

As seen in FIG. 4, the etched glass has a pyramid like shape, i.e., a mesa configuration. The aspect ratio is advantageously good. For example, 24 mil dots have been etched to a depth of 21 microns with little change in diameter and maintenance of shape. An important aspect of this method of etching glass is the rate of removal achieved in the etching. Removal rates of the order of 5 to 10 microns per minute have been achieved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for depositing a metal in a chosen pattern on a substrate body of a chosen material selected from the group consisting of soda-lime, borosilicate, boroalumino-silicate, phosphoalumino-silicate, and phosphosilicate glasses comprising the steps of:

providing as said metal, one which is capable of forming a gaseous bearing or relatively high vapor pressure compound, said compound being reducible to said metal;

providing an ablating material which assumes a gaseous state and which is substantially chemically reactive with said substrate material;

providing on the surface of said substrate body in said chosen pattern, a layer of a protective material which is substantially unchemically reactive with said ablating material;

reducing said metal compound to said metal in a reducing atmosphere in a vessel containing said substrate body having the patterned protective material layer thereon while concurrently providing in said vessel said ablating material, the surface of said protective material layer forming a nucleating surface upon which the reduced metal deposits, the portion of said substrate body surface not having said protective material layer thereon being concurrently ablated away during said reduction and said metal deposition.

2. A method as defined in claim 1 wherein said metal is one which is capable of forming a gaseous or relatively high vapor pressure compound at a temperature of from room temperature up to 700° C.

3. A method as defined in claim 1 wherein said protective material is selected from the group consisting of chromium, tungsten, molybdenum, copper, aluminum, silicon dioxide, silicon, aluminum oxide, silicon nitride, and composite layers of chromium-copper, and chromium-copper-chromium.

4. A method as defined in claim 1 wherein said ablating material is selected from the group consisting of hydrogen fluoride, hydrogen chloride, sulfur hexafluoride and sulfur hexachloride.

5. A method as defined in claim 1 wherein said reducing atmosphere is hydrogen.

6. A method for depositing copper in a chosen pattern on a glass substrate body selected from the group consisting of borosilicate and soda-lime glasses comprising:

depositing in said chosen pattern on said substrate body a layer of a protective material selected from the group consisting of chromium, tungsten, molybdenum, copper, aluminum, silicon dioxide, silicon, aluminum oxide, silicon nitride and composite layers of chromium-copper and chromium-copper-chromium;

reducing in a vessel containing said substrate having said protective material patterned layer thereon in a hydrogen atmosphere, at about 130°–150° C., copper hexafluoro-acetylacetonate while concurrently providing in said vessel hydrogen fluoride;

whereby said reduced copper deposits on said protective material layer surface while concurrently said exposed glass surface is ablated away by said hydrogen fluoride.

7. A method for providing an etched pattern on a glass body comprising:

using as said glass body, a body made of a glass selected from the group consisting of borosilicate, boroalumino-silicate, phosphoalumino-silicate, phosphosilicate and soda-lime glasses, providing on the surface of said glass body a patterned layer of a nucleating material selected from the group consisting of chromium, tungsten, molybdenum, copper, aluminum, silicon, silicon dioxide, aluminum oxide, silicon nitride, a composite layer of chromium-copper and a composite layer of chromium-copper-chromium;

reducing in a reaction chamber containing said nucleating material patterned glass body, a gaseous bearing or high vapor pressure metal compound in the presence of an glass-ablating material selected from the group consisting of hydrogen fluoride, hydrogen chloride, sulfur hexafluoride, and sulfur hexachloride whereby the metal resulting from said reduction nucleates on said nucleating layer and the surface of said glass body chemically reacts with said ablating material to be thereby ablated away; and thereafter removing said nucleating layer with the deposited metal thereon from the surface of said glass body whereby there remains an etched pattern on said glass body.

8. A method as defined in claim 7 wherein said metal compound is copper hexafluoroacetylacetonate, said nucleating material is tungsten and said glass body is made of borosilicate glass.

References Cited

UNITED STATES PATENTS

| | | | |
|---|---|---|---|
| 3,378,401 | 4/1968 | Kaspawl et al. | 117—212 |
| 3,477,872 | 11/1969 | Amick | 117—213 X |
| 3,424,627 | 1/1969 | Michel et al. | 117—107.2 X |
| 3,075,494 | 1/1963 | Toolmin, Jr. | 117—107.2 X |
| 2,833,676 | 5/1958 | Heibel et al. | 117—107.2 X |
| 3,139,658 | 7/1964 | Brenner et al. | 117—107.2 |
| 3,375,418 | 3/1968 | Garnache et al. | 117—212 X |

ALFRED L. LEAVITT, Primary Examiner

C. K. WEIFFENBACH, Assistant Examiner

U.S. Cl. X.R.

117—107.2 R, 212, 217; 156—15, 24